Dec. 30, 1958 R. W. HYDE 2,866,478
MIXING FAUCET
Filed June 18, 1953 2 Sheets-Sheet 2

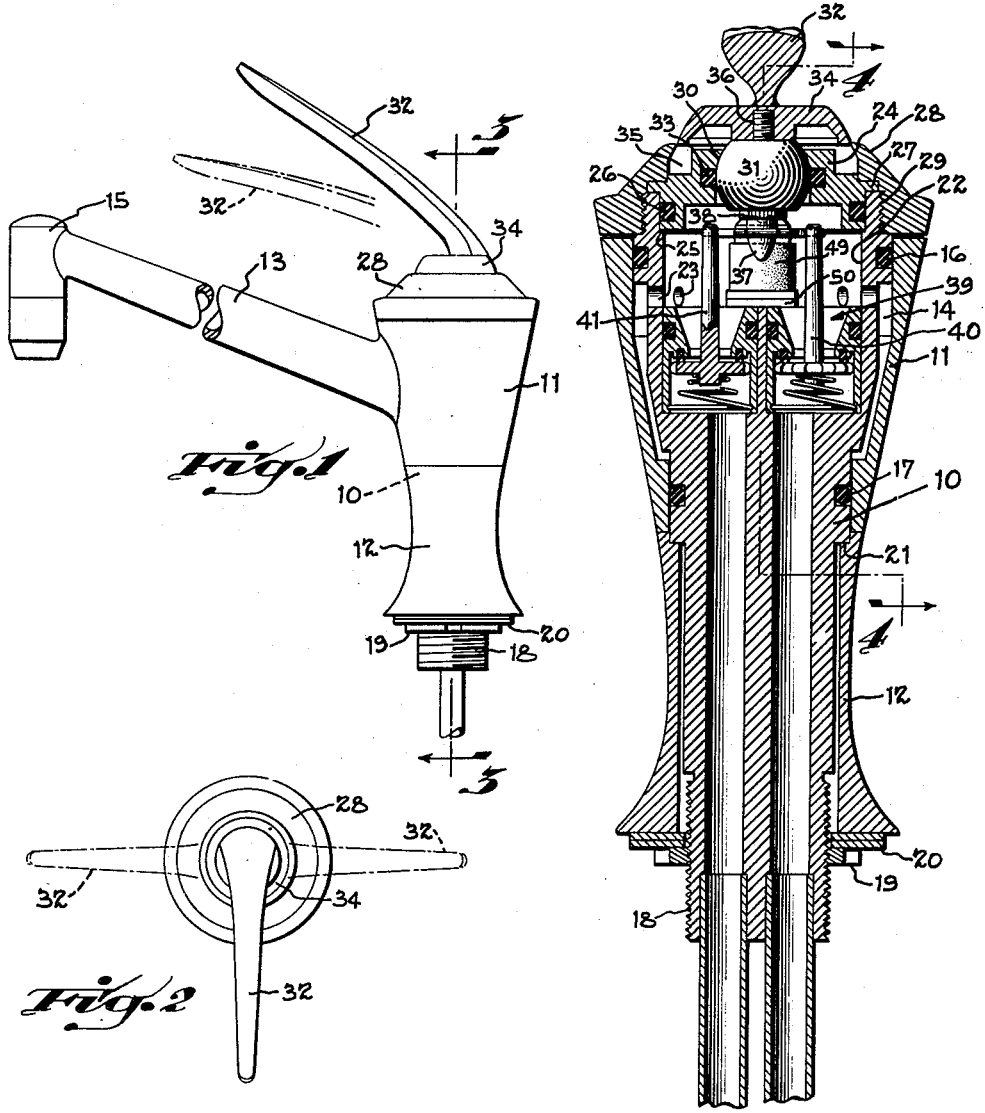

INVENTOR.
Robert W. Hyde.
BY Wood, Herron & Evans.
ATTORNEYS.

United States Patent Office 2,866,478
Patented Dec. 30, 1958

2,866,478

MIXING FAUCET

Robert W. Hyde, Cincinnati, Ohio, assignor, by mesne assignments, to American Radiator & Standard Sanitary Corporation, New York, N. Y., a corporation of Delaware Application June 18, 1953, Serial No. 362,647

5 Claims. (Cl. 137—636)

This invention relates to mixing faucets and concerns in particular mixing faucets of the type exemplified by my copending patent application Serial No. 274,965, now Patent No. 2,756,775, in which the flow of hot and cold water is controlled by one operating lever or handle.

The faucet construction of my co-pending application consists essentially of two toggle valves, one for hot water and one for cold water, which are arranged to be opened either simultaneously or independently of one another by a valve actuator. The actuator is arranged so that movement of the faucet handle in one direction, horizontally from a raised, centered, "off" position, opens the cold water valve; whereas, movement of the handle horizontally in the opposite direction from the "off" position opens the hot water valve. By depressing the handle straight down from the center or "off" position, both hot and cold water are caused to flow in equal proportions. By both depressing and swinging the handle either to the left or right, all proportions of hot and cold water can be obtained within the temperature range of the water in the respective hot and cold supply lines.

The volume of water caused to flow is dependent generally upon how far the lever is moved from the "off" position. There is only one "off" position, however, and movement of the lever in any direction from the centered position causes some water to flow.

The present invention is directed primarily to an improvement in the construction of the valve actuating means which permits the handle to be moved back and forth horizontally while in the raised position without opening either valve. Thus, instead of a single, centered position for "off," the present invention provides "off" positions through the full range of handle movement, whereby the faucet may be shut off by simply raising the handle regardless of whether it is at the cold side or the hot side of center.

There are distinct advantages to this method of operation. It makes it easier to obtain repeatedly a mixture which is of the same temperature, inasmuch as the handle may be set at one side of center and the water then turned on and off by moving the handle vertically at this point. In rinsing dishes, for example, the handle may be adjusted initially to discharge a mixture of hot water of the desired temperature at some point off center toward the hot side; and thereafter the water turned off and on by simply raising and lowering the handle. It will be appreciated that with a simple vertical movement the same temperature of water is more easily and readily obtained time after time than in an operation in which the handle must be moved at an angle to and from a center "off" position. Also, in the event that the hot water is excessively or dangerously hot, the handle may be moved, while raised, toward the cold side and then depressed to mix in a major portion of cold water to bring the temperature of the water first issuing from the spout down to a point where it is safe. If on the other hand, the water in the hot supply line is only lukewarm, the handle may be set at the hot side and then depressed from this point so that no cold water is mixed with the water coming from the hot supply line. The method of operation, therefore, may be said to permit preselection of temperature, the selection being made before the water is turned on by moving the raised handle either left or right into the temperature range desired.

In the preferred embodiment, this mode of operation is accomplished by mounting the valve actuator independently of the operaitng handle. The actuator consists of a flat cam plate which is mounted inside the faucet for movement in a horizontal plane. The actuator plate seats an actuator pin which is secured to the operating lever. The pin is vertically disposed and centered upon the axis about which the handle rotates when the handle is turned from side to side while in the raised position. The axis of the pin, with the handle in the raised position, therefore, is substantially normal to the plane of the actuator plate. Thus, rotative movement of the pin, caused by swinging the handle from side to side while it is raised, simply causes the pin to turn in its seat in the actuator plate without actually moving the plate. Depressing the handle on the other hand causes the pin to swing away from the vertical and thereby move the actuator plate to open one or both of the valves depending upon which direction the handle is moved. In the preferred embodiment, the cam plate is arranged to move between the stems of the toggle valves to open the valves equally and simultaneously when the handle is depressed from the centered position. Moving the lowered handle either right or left causes one valve to be opened more than the other. When the handle is depressed at the left end of its horizontal range of movement, cold water only is caused to flow. At the other side, only the hot water valve is contacted. Between these limits, all proportions of water from the two supply lines are obtainable.

It will be seen, therefore, that one of the objectives of the invention is to provide a single handle operated mixing valve in which the handle can be moved through the complete range of hot and cold while in the up position without causing water to flow in order that temperature may be pre-selected before it is turned on.

Other objectives and advantages of the present invention will be readily apparent to those skilled in the art from the following detailed description of the drawings in which:

Figure 1 is a side elevational view of a faucet construction embodying the principles of the present invention.

Figure 2 is a top plan view of the faucet showing the range of horizontal movement of the handle.

Figure 3 is a cross sectional view through the mixing chamber of the faucet taken on the line 3—3 of Figure 1.

Figure 5 is a cross sectional view taken on the line 5—5 of Figure 4.

Figures 4, 6:
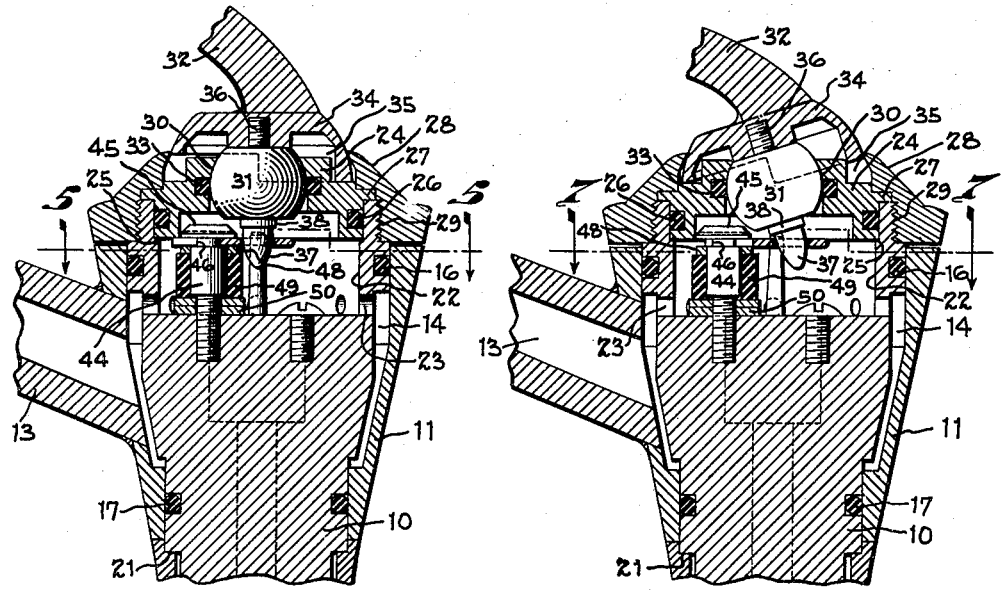
Figure 4 is a fragmentary cross sectional view taken on the line 4—4 of Figure 3.
Figure 6 is a view similar to Figure 4 showing the faucet in "on" position.

The faucet selected to illustrate the principles of the present invention includes a faucet body 10 which is enclosed by an upper housing 11 and a lower housing 12. Upper housing 11 has a spout 13 affixed to it, the spout opening from a manifold chamber 14 which surrounds body 10 of the faucet within the upper housing. In the instance shown, spout 13 has a water aerator device 15 mounted in its discharge end. The upper housing 11 is free to turn with respect to the other parts of the faucet so that the spout may be swung from side to side. The manifold chamber inside of the upper housing is sealed at the top by an O ring 16 and sealed at the bottom by an O ring 17, these two rings being seated in appropriate grooves formed in the faucet body. The lower end of the faucet body is threaded as at 18 and depends beyond lower housing 12 to provide a means to mount the faucet upon a sink or the like. The threaded portion 18 of the body is seated in an appropriate opening in the sink top (not shown) and a lock nut 19 tightened onto the threaded portion 18 to press washers 20 against the underside of the sink. An annular shoulder 21 on the body portion of the faucet seats in an appropriate rabbet in the upper rim portion of lower housing 12 so that tightening of lock nut 19 pulls the lower housing into tight seating engagement against the top of the sink.

The upper portion of the faucet body is hollowed out to provide a mixing chamber 22. This chamber is in communication with manifold 14 through a plurality of outlet ports 23 which are bored radially through the chamber wall. The upper end of chamber 22 is closed by a member 24 which seats on a shoulder 25 formed by counterturning the wall of chamber 22. The periphery of closure member 24 is sealed by an O ring 26 which is seated within an annular groove formed in its edge. Closure member 24 also has an annular flange 27 formed upon it which seats on top of the faucet body 10, being held thereon by a screw cap 28 which threads onto the body as at 29. The central portion of the closure member 24 is configurated to provide a rounded seat or socket 30 for a ball pivot 31 to which the operating handle 32 is affixed. The ball pivot is sealed anularly to prevent water leakage by an O ring 33 which is seated within a groove formed in socket 30. A circular skirt 34, which may be formed as part of the handle is provided to close the upper opening in the screw cap, it being noted from Figure 3 that closure member 24 is relieved as at 35 to accommodate the lower edge of the skirt when the handle is depressed. The skirt provides a means to limit handle movement, having a portion in the rear half thereof which seats on top of the closure member 24 when the faucet is "off," and having a cut out portion in the front half thereof to permit the handle to be depressed or lowered toward the front.

In the present instance the ball pivot 31 is secured to the handle by a bolt 36 which traverses the ball and threads into the underside of annular skirt 34. The head of the bolt, which depends into chamber 22, is substantially bullet-shaped and constitutes an actuating pin 37 which tilts upon depression of the handle. A collar 38, on pin 37, having flat sides to accommodate a wrench, seats against the underside of ball pivot 31 when the bolt 36 is tightened into place. The upper and lower sides of the ball in the instance shown are flattened to accommodate the skirt and the collar respectively.

The important consideration in the parts described above is the disposition of the actuator pin relative to the ball socket pivot 31. The axis of the pin passes through the center about which the ball rotates when the handle is turned from side to side. Thus, the pin may be turned about the vertical axis without changing its position relative to the body of the faucet. Turning the handle from side to side therefore, with the pin disposed vertically, has no effect upon the relative position of the pin. It is only when the faucet handle is raised or lowered from the position shown in Figure 3 that the pin tilts and becomes effective.

The valves, indicated generally at 39, for controlling the flow of water through the faucet are substantially identical with the valve unit disclosed in my co-pending application Serial No. 275,199, filed March 6, 1952, and now abandoned. In the embodiment disclosed in the drawings the valves are mounted vertically side by side so that their stems, indicated respectively at 40 for the cold water valve and at 41 for the hot water valve, are substantially parallel with one another and extend into chamber 22 from the bottom thereof. The valves open when the stem are tipped from the vertical and thereby permit water to flow from the respective supply lines shown in Figure 3 and into the chamber. For this purpose, an actuator plate 42 is provided which is arranged to be moved by the actuator pin to either simultaneously or independently tip the valve stems. The actuator plate is substantially horizontally disposed and is mounted for sliding movement in the horizontal plane upon a pedestal indicated generally at 43. The pedestal may consist of a stud 44 which is threaded into the bottom of chamber 22 in the front of the valves. The stud has a large head 45 thereon which is slotted to accommodate a screw driver. Just under the head, the stud is turned down to provide a groove 46. This groove receives a slot 47 which is cut in the forward edge of the actuator plate 42, to be described in detail later. A metal washer 48, a rubber bushing 49 and a pair of spacer washers 50 surround the stud under the actuator plate. The rubber bushing may be compressed slightly when the stud is threaded into place in order to provide a frictional grip upon the actuator plate where it seats upon the stud. This arrangement of parts therefore provides a means to adjust the ease with which the handle may be operated.

Attention is now directed to Figure 5. The actuator pin 37 depends through a round bore 51 which is provided in the actuator plate on the center line thereof. When the faucet is "off" this bore is aligned transversely of the faucet with the stems 40 and 41 of the respective valves. As explained above, the handle may be turned from side to side when the pin 37 is in vertical position without moving actuator plate 42. The respective side edges of the actuator plate generally taper from the front, which is to the left in Figure 5, to the rear thereof. These side edges, which are indicated at 52, constitute cam surfaces which are adapted to contact and thereby tip the respective valve stems upon movement of the actuator plate from the position shown in Figure 5. As seen from above, the actuator plate is substantially pear-shaped. Each cam surface in the rear portion of the actuator is generally concave, whereas the front portion is generally convex with the respective sides 52 bulging outwardly in the centered portion thereof.

Figures 7, 8:
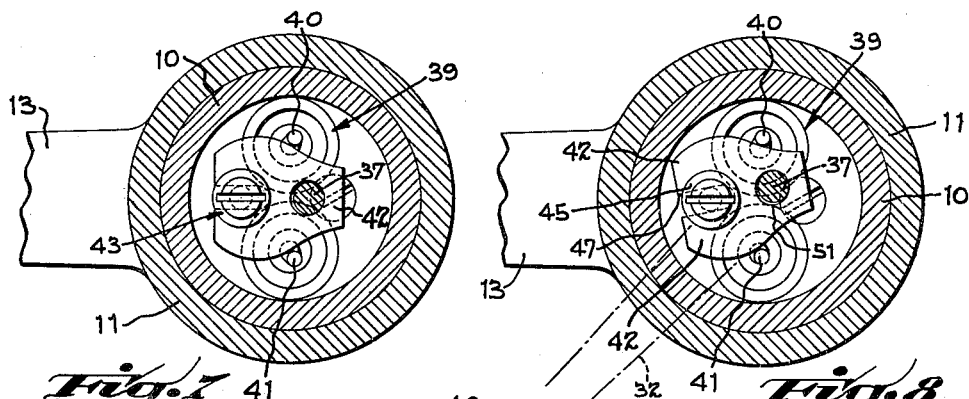
Figures 7, 8 and 9 are views similar to Figure 5 showing the valve actuator mechanism in various positions of adjustment.
Figure 9:
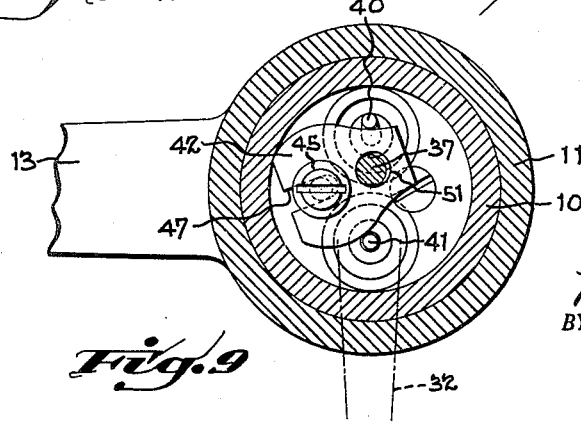

Referring now to Figure 7, it will be noted that when the actuator plate is moved to the rear, which movement results from depressing the handle from the center position, both valve stems are tipped an equal amount. Under these circumstances, hot and cold water flows into chamber 22, in equal proportions. Figure 8 shows a condition in which one of the valve stems is tipped considerably more than the other; and Figure 9 a condition in which one valve is fully open and the other completely closed. Inasmuch as the left valve is opened when the handle is swung to the right as shown in Figures 8 and 9, the hot and cold water supply lines leading to the faucet must be reversed in order to maintain the standard hot-cold relationship in which hot water is obtained by swinging the faucet handle to the left and cold water obtained by swinging the faucet handle to the right.

Although only three positions of the actuator plate are shown, it will be appreciated however, that all proportions of hot and cold water may be obtained. Generally the farther the handle is depressed, within the limits provided by skirt 34, the more the actuator plate is moved to the rear, or to the right as seen in Figures 7 and 9, with the result that a greater volume of water is discharged. At no time, however, will the plate be moved when the actuator pin 37 is vertically disposed with respect to the actuator plate. It is this relationship that permits the handle to be swung from side to side while in the raised position in order to permit pre-selection of the temperature of water to be obtained when the handle is finally depressed or lowered.

In this disclosure, the principles of the invention are applied to a water faucet. It will be understood, however, that faucets or control valves constructed in accordance with the present invention may be utilized to dispense any two fluids where it is desirable to provide a full range of proportionate mixtures of the fluids.

Having described my invention, I claim:

1. A single lever mixing faucet comprising a faucet body having a mixing chamber therein, a discharge spout in communication with said mixing chamber, a pair of toggle valves, each valve of the pair having a valve stem extending into said mixing chamber, the respective stems being disposed in a common vertical plane and in spaced parallel relation with respect to one another, said valves being adapted to open upon the tipping of their stems from the vertical, a valve actuator plate, means to mount said valve actuator plate in said mixing chamber for movement in a horizontal plane, said actuator plate being substantially pear-shaped in outline as seen from above and normally disposed with the large end thereof in front of the plane of the valve stems and the small end thereof between the valve stems, an operating handle, a ball mounting said handle in the faucet body above said mixing chamber for rotating and rocking movement about a point which is in the plane of the valve stems and which is centered above them, an actuator pin depending from the under side of said ball into said mixing chamber, a circular opening in said plate which is disposed directly below said point when the plate is in its said normal position, said pin depending into said opening and having its axis disposed vertically and at right angles to the plane of said plate when said plate is in its said normal position, whereby said handle may be rotated about the axis of the pin without moving the actuator plate and whereby said actuator plate may be moved rearwardly into valve stem contacting positions upon rocking movement of the handle to tilt said actuator pin rearwardly away from the vertical.

2. In a faucet of the type having a single handle for controlling the flow of hot and cold water, a mixing chamber in said faucet, a pair of toggle valves seated in the bottom of said chamber, each of said valves having a valve stem extending into said chamber, the respective valve stems being disposed in spaced parallel relationship when said valves are closed, said valves adapted to open when said stems are tipped, means to selectively open said valves, said means comprising an actuator plate, said actuator plate being substantially pear-shaped in outline, said plate mounted for sliding movement in a horizontal plane into and out of valve stem tipping positions, an actuator pin depending into said mixing chamber and traversing a bore in said plate, said pin being adapted for rotative movement relative to said actuator plate when the axis of said pin is normal to the actuator plate and being adapted to be tilted upon movement of the handle to move said actuator plate into valve stem tipping positions, and said pin and actuator plate being so constructed and arranged that the axis of the pin is normal to the actuator plate when said actuator plate is clear of said valve stems.

3. In a water faucet having a pair of valves for controlling the flow of hot and cold water respectively, each valve having a stem adapted to be tipped to open the valve, the respective stems residing in spaced parallel relation when said valves are closed, means to selectively tip said valve stems to open said vales, said means comprising an actuator plate, said actuator plate being mounted for movement in a plane substantially normal to said stems when the valves are closed, a closure member sealing the upper end of said mixing chamber, a ball pivot socketed in said closure member, an operating handle secured to said ball pivot outside of said chamber, an actuator pin extending into said chamber from the inner side of said ball pivot, said pin being substantially bullet-shaped and traversing a bore in said actuator plate, and said pin and plate being so constructed and arranged that the axis of the pin is substantially normal to said plate when said plate is out of position to contact said valve stems, whereby the handle may be turned about the axis of the pin without causing said actuator plate to move and whereby said actuator plate may be moved into valve stem contacting positions upon movement of the handle to tilt said pin with respect to said plate.

4. In a faucet for proportioning and mixing hot and cold water, a chamber, a pair of toggle valves to control the flow of hot and cold water respectively into said chamber, each of said valve units having a stem extending into said chamber, the respective stems being substantially parallel with one another and disposed in spaced relationship, an actuator plate, said actuator plate being substantially pear-shaped in outline and mounted for movement in a horizontal plane between said stems to contact one or both of said valve stems, a tiltable actuator pin depending into said chamber and traversing a bore in said actuator plate, a handle adapted to be moved to tilt said pin, and said pin and plate being so constructed and arranged so that the axis of said pin is substantially normal to said plate when said plate is out of contact with said stems, said pin being adapted to be rotated relative to said actuator plate in the last named position of said pin.

5. In a water faucet having a mixing chamber therein, a pair of valves to control the flow of hot and cold water respectively into the said chamber, each of said valves having a valve operating stem extending into said chamber, the respective stems being substantially parallel with one another and disposed in spaced relationship, an actuator plate disposed in said chamber in a plane which is normal to said stems, means mounting said plate for movement into positions to contact one or both of said stems to open said valves respectively simultaneously or independently, a tiltable actuator pin extending into said chamber and traversing a bore in said actuator plate, said pin being adapted for rotating movement relative to said plate, and a handle adapted to be moved to tilt said pin to move said actuator plate into said positions.

References Cited in the file of this patent

UNITED STATES PATENTS

| | | |
|---|---|---|
| 2,106,929 | McClure | Feb. 1, 1938 |
| 2,197,586 | McClure | Apr. 16, 1940 |
| 2,301,439 | Moen | Nov. 10, 1942 |
| 2,756,775 | Hyde | July 31, 1956 |

FOREIGN PATENTS

| | | |
|---|---|---|
| 762,270 | France | of 1934 |